(12) United States Patent
Elsbernd et al.

(10) Patent No.: US 11,136,464 B2
(45) Date of Patent: *Oct. 5, 2021

(54) ARTICLES SUBJECT TO ICE FORMATION COMPRISING A REPELLENT SURFACE

(71) Applicant: 3M INNOVATIVE PROPERTIES COMPANY, St. Paul, MN (US)

(72) Inventors: Cheryl L. S. Elsbernd, Woodbury, MN (US); Adam J. Meuler, Woodbury, MN (US); Guglielmo Memo Izzi, Maplewood, MN (US); Zachary J. Malmberg, Roseville, MN (US); Thomas E. S. Muehle, Woodbury, MN (US); Jian Li, Ontario (CA)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/773,146

(22) Filed: Jan. 27, 2020

(65) Prior Publication Data

US 2020/0157357 A1    May 21, 2020

Related U.S. Application Data

(63) Continuation of application No. 15/769,377, filed as application No. PCT/US2016/056742 on Oct. 13, 2016, now Pat. No. 10,584,249.

(Continued)

(51) Int. Cl.
| | |
|---|---|
| *C09D 5/00* | (2006.01) |
| *C09D 7/00* | (2018.01) |
| *C08K 5/435* | (2006.01) |

(52) U.S. Cl.
CPC ............... *C09D 5/00* (2013.01); *C09D 7/00* (2013.01); *C08K 5/435* (2013.01)

(58) Field of Classification Search
CPC ............. C09D 5/00; C09D 7/00; C08K 5/435
(Continued)

(56) References Cited

U.S. PATENT DOCUMENTS

| | | |
|---|---|---|
| 2,504,482 A | 4/1950 | Goldman |
| 2,622,598 A | 12/1952 | Rosenblum |

(Continued)

FOREIGN PATENT DOCUMENTS

| | | |
|---|---|---|
| CA | 2079542 | 4/1993 |
| CN | 1279697 | 1/2001 |

(Continued)

OTHER PUBLICATIONS

Advanced Technologies, Product data sheet for Nusil r-2180, 2018, 3 pages.

(Continued)

*Primary Examiner* — William K Cheung
(74) *Attorney, Agent, or Firm* — Carolyn A. Fischer

(57) ABSTRACT

Articles subject to ice formation during normal use are described. The article comprises a repellent surface such that the receding contact angle of the surface with water ranges from 90 degrees to 135 degrees. The repellent surface comprises a fluorochemical material, typically in combination with a non-fluorinated organic polymeric binder. The fluorochemical material is preferably a compound having the formula: $(R_f-L-P)_n A$ $R_f$ is a fluorinated group; L is independently an organic divalent linking group; P is a catenary, divalent heteroatom-containing carbonyl moiety, such as —C(O)O—; A is hydrocarbon moiety; and n typically ranges from 1 to 3; also described are methods of making an article comprising providing an article subject to ice formation during normal use and providing a liquid repellent surface, as described herein, on at least a portion of the article.

21 Claims, 1 Drawing Sheet

Related U.S. Application Data

(60) Provisional application No. 62/327,805, filed on Apr. 26, 2016, provisional application No. 62/247,238, filed on Oct. 28, 2015.

(58) Field of Classification Search
USPC .................................................. 524/168
See application file for complete search history.

(56) References Cited

U.S. PATENT DOCUMENTS

| | | | |
|---|---|---|---|
| 2,688,568 A | 9/1954 | Miskel | |
| 2,803,656 A | 8/1957 | Ahlbrecht | |
| 3,372,125 A | 3/1968 | Hill | |
| 3,746,196 A | 7/1973 | Sako | |
| 3,759,874 A | 9/1973 | Gresham | |
| 3,787,351 A | 1/1974 | Olson | |
| 4,209,610 A | 6/1980 | Mares | |
| 4,301,208 A | 11/1981 | Jellinek | |
| 4,508,916 A | 4/1985 | Newell | |
| 4,595,628 A | 6/1986 | Kelly | |
| 4,791,166 A | 12/1988 | Saukaitis | |
| 5,169,900 A | 12/1992 | Gudelis | |
| 5,187,015 A | 2/1993 | Yorkgitis | |
| 5,213,743 A | 5/1993 | Ohara | |
| 5,221,497 A | 6/1993 | Watanabe | |
| 5,267,693 A | 12/1993 | Dickey | |
| 5,350,795 A | 9/1994 | Smith | |
| 5,459,188 A | 10/1995 | Sargent | |
| 5,476,901 A | 12/1995 | Smith | |
| 5,560,992 A | 10/1996 | Sargent | |
| 5,582,350 A | 12/1996 | Kosmyna | |
| 5,618,903 A | 4/1997 | Hoxmeier | |
| 5,637,657 A | 6/1997 | Anton | |
| 5,641,835 A | 6/1997 | Smith | |
| 5,670,573 A | 9/1997 | Kirchner | |
| 5,674,592 A | 10/1997 | Clark | |
| 5,728,469 A | 3/1998 | Mann | |
| 5,747,392 A | 5/1998 | Xiao | |
| 5,789,491 A | 8/1998 | Liss | |
| 5,798,402 A | 8/1998 | Fitzgerald | |
| 5,859,126 A | 1/1999 | Anton | |
| 5,898,046 A | 4/1999 | Raiford | |
| 5,914,384 A | 6/1999 | Anton | |
| 5,977,390 A | 11/1999 | Raiford | |
| 6,013,715 A | 1/2000 | Gornowicz | |
| 6,063,474 A | 5/2000 | Raiford | |
| 6,114,419 A | 9/2000 | Liss | |
| 6,127,485 A | 10/2000 | Klun | |
| 6,150,020 A | 11/2000 | Dharmadhikary | |
| 6,171,983 B1 | 1/2001 | Coppens | |
| 6,183,872 B1 | 2/2001 | Tanaka | |
| 6,262,180 B1 | 7/2001 | Klun | |
| 6,361,870 B1 | 3/2002 | Steffi | |
| 6,362,135 B1 | 3/2002 | Greer | |
| 6,387,999 B1 | 5/2002 | Dirschl | |
| 6,462,115 B1 | 10/2002 | Takahashi | |
| 6,465,107 B1 | 10/2002 | Kelly | |
| 6,511,753 B1 | 1/2003 | Teranishi | |
| 6,586,522 B1 | 7/2003 | Jariwala | |
| 6,664,318 B1 | 12/2003 | Bymark | |
| 6,753,380 B2 | 6/2004 | Qiu | |
| 6,803,109 B2 | 10/2004 | Qiu | |
| 6,860,926 B2 | 3/2005 | Ishikawa | |
| 6,908,607 B2 | 6/2005 | Banerjee | |
| 7,041,727 B2 | 5/2006 | Kubicek | |
| 7,105,233 B2 | 9/2006 | Bechthold | |
| 7,375,698 B2 | 5/2008 | Wolfenden | |
| 7,396,866 B2 | 7/2008 | Jariwala | |
| 7,399,807 B2 | 7/2008 | Day | |
| 7,659,351 B2 | 2/2010 | Caldwell | |
| 7,718,264 B2 | 5/2010 | Klun | |
| 7,857,905 B2 | 12/2010 | Hayes | |
| 7,897,666 B1 | 3/2011 | Berg | |
| 8,497,021 B2 | 7/2013 | Simpson | |
| 8,535,779 B1 | 9/2013 | Smith | |
| 8,574,704 B2 | 11/2013 | Smith | |
| 8,821,984 B2 | 9/2014 | Jariwala | |
| 8,993,116 B2 | 3/2015 | Jariwala | |
| 9,012,548 B2 | 4/2015 | Inagaki | |
| 9,175,188 B2 | 11/2015 | Buckanin | |
| 9,187,678 B2 | 11/2015 | Boardman | |
| 9,197,678 B2 | 11/2015 | Heinla | |
| 9,353,646 B2 | 5/2016 | Aizenberg | |
| 9,371,173 B2 | 6/2016 | Smith | |
| 9,441,079 B2 | 9/2016 | Yang | |
| 10,391,506 B2 * | 8/2019 | Meuler | ................. B05B 7/2424 |
| 10,584,249 B2 * | 3/2020 | Elsbernd | .................. C09D 5/00 |
| 2003/0235696 A1 | 12/2003 | Byrd | |
| 2004/0037961 A1 | 2/2004 | Dieleman | |
| 2004/0092675 A1 | 5/2004 | Moore | |
| 2005/0016489 A1 | 1/2005 | Endicott | |
| 2005/0054804 A1 | 3/2005 | Dams | |
| 2005/0143541 A1 | 6/2005 | Caldwell | |
| 2005/0145134 A1 | 7/2005 | Petrin | |
| 2005/0164010 A1 | 7/2005 | Trombetta | |
| 2005/0234147 A1 | 10/2005 | Sakabe | |
| 2006/0128850 A1 | 6/2006 | Jariwala | |
| 2006/0142474 A1 | 6/2006 | Moore | |
| 2006/0153993 A1 | 7/2006 | Schmidt | |
| 2006/0209127 A1 | 9/2006 | Inoue | |
| 2006/0248656 A1 | 11/2006 | Tung | |
| 2006/0281861 A1 | 12/2006 | Putnam | |
| 2008/0039558 A1 | 2/2008 | Lazzari | |
| 2008/0047465 A1 | 2/2008 | Yen | |
| 2008/0299347 A1 | 12/2008 | Ukei | |
| 2008/0306238 A1 | 12/2008 | Jariwala | |
| 2009/0069464 A1 | 3/2009 | Standke | |
| 2009/0081384 A1 | 3/2009 | Plissonnier | |
| 2009/0159751 A1 | 6/2009 | Wittmer | |
| 2009/0203276 A1 | 8/2009 | Kutsenko | |
| 2009/0294724 A1 | 12/2009 | Attar | |
| 2010/0035039 A1 | 2/2010 | Jing | |
| 2010/0047845 A1 | 2/2010 | Woodside | |
| 2010/0092621 A1 | 4/2010 | Akutsu | |
| 2010/0107556 A1 | 5/2010 | Monti | |
| 2010/0314575 A1 | 12/2010 | Gao | |
| 2011/0033694 A1 | 2/2011 | Jing | |
| 2011/0135839 A1 | 6/2011 | Dziomkina | |
| 2011/0207038 A1 | 8/2011 | Yu | |
| 2011/0229667 A1 | 9/2011 | Jin | |
| 2011/0305738 A1 | 12/2011 | Ladizinsky | |
| 2012/0058330 A1 | 3/2012 | Smith | |
| 2012/0107556 A1 | 5/2012 | Zhang | |
| 2013/0045332 A1 | 2/2013 | Fang | |
| 2013/0140004 A1 | 6/2013 | Behrens | |
| 2013/0178568 A1 | 7/2013 | Meuler | |
| 2013/0186799 A1 | 7/2013 | Stam | |
| 2013/0216820 A1 | 8/2013 | Riddle | |
| 2013/0224478 A1 | 8/2013 | Jing | |
| 2013/0251946 A1 | 9/2013 | Azimi | |
| 2014/0120340 A1 | 5/2014 | Riddle | |
| 2014/0147627 A1 | 5/2014 | Aizenberg | |
| 2014/0147631 A1 | 5/2014 | Yang | |
| 2014/0178611 A1 | 6/2014 | Smith | |
| 2014/0287243 A1 | 9/2014 | Weber | |
| 2014/0295149 A1 | 10/2014 | Ito | |
| 2014/0311940 A1 | 10/2014 | Braveman | |
| 2014/0322543 A1 | 10/2014 | Jonckheree | |
| 2015/0030796 A1 | 1/2015 | Boardman | |
| 2015/0166820 A1 | 6/2015 | Ikeyama | |
| 2015/0038909 A1 | 8/2015 | Mori | |
| 2015/0238909 A1 | 8/2015 | Mori | |
| 2015/0273522 A1 | 10/2015 | Boscher | |
| 2015/0352546 A1 | 12/2015 | Egeler | |
| 2015/0353813 A1 | 12/2015 | Guenthner | |
| 2016/0200915 A1 | 7/2016 | Radchenko | |
| 2018/0298209 A1 * | 10/2018 | Elsbernd | .................. C09D 7/63 |

FOREIGN PATENT DOCUMENTS

| | | |
|---|---|---|
| CN | 101358106 | 5/2011 |
| CN | 102321415 | 1/2012 |
| CN | 102031057 | 7/2012 |
| CN | 103998414 | 8/2014 |

(56) References Cited

FOREIGN PATENT DOCUMENTS

| | | |
|---|---|---|
| DE | 10004132 | 8/2001 |
| EP | 0339583 | 11/1989 |
| EP | 0484093 | 5/1992 |
| EP | 0860490 | 8/1998 |
| EP | 0905179 | 3/1999 |
| EP | 0768921 | 10/1999 |
| EP | 1493761 | 1/2005 |
| EP | 2607397 | 6/2013 |
| GB | 1477055 | 6/1977 |
| JP | S56-154860 | 11/1981 |
| JP | S61-023656 | 2/1986 |
| JP | H01-313582 | 12/1989 |
| JP | H03-041160 | 2/1991 |
| JP | H04-005260 | 1/1992 |
| JP | H04-149294 | 5/1992 |
| JP | H42-070649 | 9/1992 |
| JP | H05-239381 | 9/1993 |
| JP | H05-331407 | 12/1993 |
| JP | H05-338087 | 12/1993 |
| JP | 06316548 A * | 11/1994 |
| JP | H06-316548 | 11/1994 |
| JP | 2000-087014 | 3/2000 |
| JP | 2001-508698 | 7/2001 |
| JP | 2002-053792 | 2/2002 |
| JP | 3306454 | 7/2002 |
| JP | 2004-531598 | 10/2004 |
| JP | 2007-297543 | 11/2007 |
| JP | 2008-524376 | 7/2008 |
| JP | 2014-509959 | 7/2008 |
| JP | 2010-222559 | 10/2010 |
| JP | 2011-67710 | 4/2011 |
| JP | 2015-144548 | 8/2015 |
| WO | 1994-26830 | 11/1994 |
| WO | 1996-01152 | 1/1996 |
| WO | 1996-39349 | 12/1996 |
| WO | 1998-32539 | 7/1998 |
| WO | 1998-43886 | 10/1998 |
| WO | 2001-096654 | 12/2001 |
| WO | 2002-072657 | 9/2002 |
| WO | 2004-090065 | 10/2004 |
| WO | 2005-113690 | 12/2005 |
| WO | 2008-104063 | 9/2008 |
| WO | 2008-154414 | 12/2008 |
| WO | 2009-045856 | 4/2009 |
| WO | 2009-140482 | 11/2009 |
| WO | 2010-002859 | 1/2010 |
| WO | 2010-062843 | 6/2010 |
| WO | 2012-064646 | 5/2012 |
| WO | 2012-100099 | 7/2012 |
| WO | 2012-121858 | 9/2012 |
| WO | 2012-173803 | 12/2012 |
| WO | 2013-115868 | 8/2013 |
| WO | 2013-127054 | 9/2013 |
| WO | 2013-172823 | 11/2013 |
| WO | 2013-177579 | 11/2013 |
| WO | 2014-010534 | 1/2014 |
| WO | 2014-012039 | 1/2014 |
| WO | 2014-012052 | 1/2014 |
| WO | 2014-012072 | 1/2014 |
| WO | 2014-012078 | 1/2014 |
| WO | 2014-012079 | 1/2014 |
| WO | 2014-012080 | 1/2014 |
| WO | 2014-035742 | 3/2014 |
| WO | 2014-078867 | 5/2014 |
| WO | 2014-097309 | 6/2014 |
| WO | 2014-107811 | 7/2014 |
| WO | 2014-148909 | 9/2014 |
| WO | 2014-209441 | 12/2014 |
| WO | 2015-074077 | 5/2015 |
| WO | 2015-157219 | 10/2015 |
| WO | 2015-161233 | 10/2015 |
| WO | 2016-069239 | 5/2016 |
| WO | 2016-069674 | 5/2016 |
| WO | 2016-176350 | 11/2016 |
| WO | 2017-074708 | 5/2017 |
| WO | 2017-074709 | 5/2017 |
| WO | 2017-074817 | 5/2017 |
| WO | 2017-189215 | 11/2017 |
| WO | 2017-189475 | 11/2017 |
| WO | 2017-189681 | 11/2017 |
| WO | 2017-189684 | 11/2017 |

OTHER PUBLICATIONS

"Adaptive Surface Coatings, High Performance, Low Environmental Impact", [retrieved from the internet on Jun. 18, 2018], URL < https://adaptivesurface.tech/ >, previously Slips technologies, pp. 1-6.
Bohn, "Insect Aquaplaning: Nepenthes Pitcher Plants Capture Prey with the Peristome, a Fully Wettable Water-Lubricated Anisotropic Surface", Proceedings of the National Academy of Sciences, Sep. 28, 2004, vol. 101, No. 39, pp. 14138-14143.
Bragg, The Form Birefringence of Macromolecules, Acta Cryst. 1953, vol. 6, pp. 865-867.
Cab-O-Sperse Dipersions for Industrial Coatings, Application Guide, Cabot, 2013, 2 pages.
Cansealid Paint Can Lids, http://www.cansealid.com, pp. 1-4, Mar. 30, 2017.
Chhatre, "Thermal Annealing Treatment to Achieve Switchable and Reversible Oleophobicity on Fabrics," Langmuir, 2009, vol. 25, pp. 13625-13632.
Deltron High Velocity Clearcoat, DC3000, 2006, 4 pages.
Diatomaceous earth, [Online] {retrieved from internet on June, 8, 2014}, URL <http:l/en. wikipedia.org/wiki/Diatomaceous earth>, 1 page.
Douillard et al. "Contact Angles of Water-2-Butoxyethanol System Against Glass Exploration of the Phase Diagram," Advances in Colloid and Interface Science 39 (1992) 225-234.
Dow Corning "Ultra Hight Molecular Weight Functional Siloxane Additives in Polymers: Effects on Processing and Properties" p. 1-16, 2001.
Dow Corning MB50-002 Masterbatch Product Information, Jun. 2, 2014, pp. 1-4.
DuPont FEP Film, Fluorocarbon Film—Information bulletin, DUPONT, 9pages.
DuPont FEP Film, Fluorocarbon Film—Properties bulletin, DUPONT, 4pages.
DuPont Teflon PTFE fluoropolymer resin, 38 pages.
DuPont Zonyl 8857A, Anti-Block and cleanability Additive, DUPONT, 2pages.
DuPont Zonyl Fluoroadditives for coatings Technical Information, 2003, 4 pages.
Earlex HV5500 or HV6900 1 qt. PTFE Coated Metal Paint Container, 2015, 2 pages.
Elvacite 1010 Macromonomer, Lucite International Inc., Specialty, Polymers & Resins Ltd, 5 pages.
Estane 5703 TPU, Lubrizol Engineered Polymers, 2014, 1 page.
Gao, "Teflon is Hydrophilic. Comments on Definitions of Hydrophobic, Shear Versus Tensile Hydrophobicity, and Wettability Characterization," Langmuir, Feb. 2008, vol. 24, No. 17, pp. 9183-9188.
Gao, "Wetting 101," Langmuir, Jul. 2009, vol. 25, No. 24, p. 14105-14115.
GELEST Inc., "Silane Coupling Agents: Connecting Across Boundaries v. 2.0," 2006, pp. 1-54.
Gemici, Hydrothermal Treatment of Nanoparticle Thin Films for Enhanced Mechanical Durability, Langmuir, 2008, vol. 24, pp. 2168-2177.
Huang, "Omniphobic Slippery Coatings Based on Lubricant-Infused Porous Polyelectrolyte Multilayers", ACS Macro Lett. 2013, vol. 2, pp. 826-829.
Information Bulletin: DuPont FEP Fluorocarbon Film, 2010, 9 pages.
Jellinek, "Ice releasing block-copolymer coating", Colloid & Polymer Science, 1978, vol. 256, No. 6, pp. 544-551.
Krumpfer, "Contact Angle Hysteresis: A Different View and a Trivial Recipe for Low Hysteresis Hydrophobic Surfaces," Faraday Discussion, May 2010, vol. 146, pp. 103-111.

(56) References Cited

OTHER PUBLICATIONS

Liquiglide, "Liquiglide Is Revolutionizing the Way Liquids Move", [retrieved from the internet on Jun. 18, 2018], URL <www.liquiglide.com>, pp. 1-4.
LiquiGlide Coating for Paint Eliminates a Sticky Problem, 2 pages.
Liquiglide, Videos available on the website <www.liquiglide.com>, Accessed on Jul. 31, 2014, 5 pages.
Li, "What do we Need for a Superhydrophobic Surface? A Review on the Recent Progress in the Preparation of Superhydrophobic Surfaces," Chemical Society Reviews Jan. 2007, vol. 36, pp. 1350-1368.
Madani, The aggregation status of nanosilicas and silica fume, used in cementitious mixtures, Third International Conference on Sustainable Construction Materials and Technologies, 10 pages.
Marflex 1122 Polyethylene-Safety data sheet, Chevron Philips, 2015, 10pages.
Material Safety Data Sheet, Envirobase HP, Sep. 9, 2014, 11 pages.
Material Safety Data Sheet, High Velocity Clearcoat, DC3000, Mar. 15, 2014, 11 pages.
Material Safety Data Sheet, Mid Temp Hardener, DCH3085, Mar. 15, 2014, 10 pages.
Meuler, Examination of Wettability and Surface Energy in Fluorodecyl POSS/Polymer Blends, Soft Matter, Sep. 2011, vol. 7, pp. 10122-10134.
Meuler, "Relationships Between Water Wettability and Ice Adhesion", ACS Applied Materials & Interfaces, Oct. 2010, vol. 2, No. 11, pp. 3100-3110.
Norton FEP Fluoropolymer Film, Saint-Gobain Performance Plastics Corporation, 2002, 2 pages.
O'Lenick Jr., "Alkyl Dimethicone", Chapter 10, Silicones for Personal Care, 2nd Edition, pp. 171-175.
Parent, "Anti-Icing and De-Icing Techniques For Wind Turbines: Critical Review", Cold Regions Science and Technology, vol. 65, 2011, pp. 88-96.
Product Information: DuPont Zonyl 8857A, Anti-Block and Cleanability Additive, DuPont, 2001, 2 pages.
Product Information: Estane 5703 TPU, Lubrizol Engineered Polymers, The Lubrizol Corporation, 2014, 1 page.
Product Information: Norton FEP FuoropolymerFilm, Saint-Gobain Performance Plastics Corporation, 2002, 2 pages.
Product Information: Styron 685D, Styron LLC, Mar. 2014, 2 pages.
Properties Bulletin: DuPont FEP Fluorocarbon Film, DuPont, 2010, 4 pages.
Quere, "Non-Sticking Drops", Reports on Progress in physics, Sep. 7, 2005, vol. 68, No. 11, pp. 2495-2532.
Ryan, "Ultra-High-Molecular-Weight Functional Siloxane Additives in Polymer. Effects on Processing and Properties", Journal of Vinyl & Additive Technology, 2000, vol. 06, No. 01, pp. 07-19.
Sacramento Metro AQMD Rule 459 PPG Envirobase High Performance, 2014, 2 pages.
Safety Data Sheet: MarFlex 1122 Polyethylene, Version 1.2, Chevron Phillips Chemical Company LP, Jan. 2015, 10 pages.
Safety Data Sheet: TEFLON AF Amorphous Fluoropolymer, Version 2.0, DuPont, Oct. 2007, 4 pages.
Safety Data Sheet, Poly (methyl methacrylate), AlfaAesar A Johnson Matthey Company, May 29, 2015, 4 pages.
Safety Data Sheet, Poly (vinyl chloride), Sigma-Aldrich, Aug. 25, 2015, 8 pages.
Safety Data Sheet, Polystyrene, atactic, Apr. 29, 2015, 4 pages.
Sayward, "Seeking Low Ice Adhesion", Special Report 79-11; U.S. Army Cold Regions Research and Engineering Laboratory, Hanover, NH, Apr. 1979, 87 pages.
Silazanes—Organosilicon, [Online] [retrieved from internet on Sep. 4, 2014] URL <http://www.sigmaaldrich.com/chemistry/chemistry-products.html ? TablePage=16245452>, 1 page.
Smith, "Droplet Mobility on Lubricant-Impregnated Surfaces," Soft Matter, 2013, vol. 9, pp. 1772-1780.
Styron 685D—Product information, AmSty, 2014, 2pages.
Teflon AF Amorphous Fluoropolymer—Safety data sheet, DUPONT, 2007, 4pages.
Teflon Beaker Liner Pricing, Welch Fluorocarbon Inc., Feb. 24, 2012, 1 page.
Teng, Overview of the Development of the Fluoropolymer Industry, Applied Science, 2012, vol. 2, pp. 496-512.
The use of AERODISP fumed silica dispersions to enhance waterborne coatings, Technical Information 1371, EVONIK, 16 pages.
Tuteja, "Robust Omniphobic Surfaces," PNAS, Nov. 2008, vol. 105, No. 47, pp. 18200-18205.
Wong, "Bioinspired Self-Repairing Slippery Surfaces with Pressure-Stable Omniphobicity," Nature, Sep. 2011, vol. 477, pp. 443-447.
Yilgor, Progress in Polymer Science Silicone containing copolymers: Synthesis, properties and applications 2014 1165-1195.
International Search Report for PCT International Application No. PCT/US2016/056742, dated Jan. 16, 2017, 5 pages.
International Search Report for PCT International Application No. PCT/US2015/057686 dated Mar. 2, 2016, 6 pages.
International Search report for PCT International Application No. PCT/US2017/029240 dated Jul. 13, 2017, 5 pages.
International Search Report and Written Opinion for PCT International Application No. PCT/US2015/054820, dated May 23, 2016, 12 pgs.
International Search Report and Written Opinion for PCT International Application No. PCT/US2016/056749, dated Jan. 12, 2017, 7 pgs.
International Search Report and Written Opinion for PCT International Application No. PCT/US2016/058166, dated Feb. 6, 2017, 17 pgs.
Dalili, et al., "A review of surface engineering issues critical to wind turbine performance," Renewable & Sustainable Energy Reviews, vol. 13, (2009), pp. 428-438.

* cited by examiner

ARTICLES SUBJECT TO ICE FORMATION COMPRISING A REPELLENT SURFACE

CROSS REFERENCE TO RELATED APPLICATIONS

This application is a continuation of U.S. application Ser. No. 15/769,377, filed Apr. 19, 2018, now issued as U.S. Pat. No. 10,584,249, which is a national stage filing under 35 U.S.C. 371 of PCT/US2016/056742, filed Oct. 13, 2016, which claims the benefit of U.S. Provisional Application No. 62/327,805, filed Apr. 26, 2016 and U.S. Provisional Application No. 62/247,238, filed Oct. 28, 2015, the disclosure of which is incorporated by reference in its/their entirety herein.

SUMMARY

In one embodiment, an article subject to ice formation during normal use is described. The article comprises a repellent surface such that the receding contact angle of the surface with water ranges from 90 degrees to 135 degrees. The repellent surface comprises a fluorochemical material, typically in combination with a non-fluorinated organic polymeric binder. The fluorochemical material is preferably a compound having the formula:

$R_f$ is a fluorinated group;
L is independently an organic divalent linking group;
P is a catenary, divalent heteroatom-containing carbonyl moiety, such as —C(O)O—;
A is hydrocarbon moiety;
and n typically ranges from 1 to 3.

Also described are methods of making an article comprising providing an article subject to ice formation during normal use and providing a liquid repellent surface, as described herein, on at least a portion of the article.

DETAILED DESCRIPTION

Figure 1:
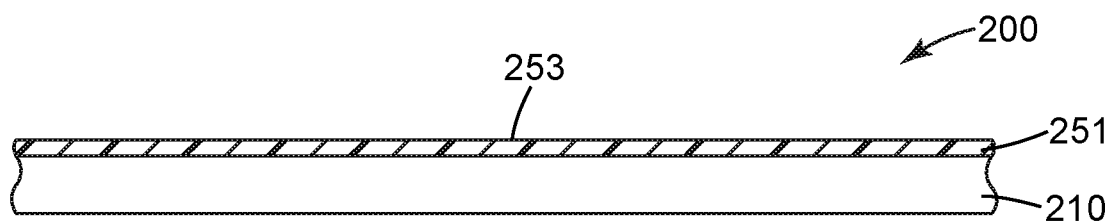
FIG. 1 is cross-sectional view of an embodied substrate comprising a repellent surface layer.

Presently described are articles or components thereof that are subject to ice formation during their normal use. The term "ice" includes any form of frozen water including frost, freezing rain, sleet and snow.

Representative articles include sign faces, signal transmission lines (e.g., telephone and electrical cables), satellite dishes, antennas, solar panels, wind turbine blades, automobiles, railroad cars, aircraft, watercraft, navigation equipment, heat pumps and exchangers or components thereof, ice manufacturing facilities and articles including ice-cube trays and other "ice maker" components; commercial and residential refrigerators and freezers; cryogenic and supercomputer storage facilities; buildings, transportation signs, roofing, dams (especially near a lock), oil drilling platforms, outdoor sporting equipment; recreational vehicles such as snowmobiles, and snow removal equipment.

A heat exchanger is an article used to transfer heat between one or more fluids. The fluids may be separated by a solid wall to prevent mixing or they may be in direct contact. They are widely used in space heating, refrigeration, air conditioning, power stations, chemical plants, petrochemical plants, petroleum refineries, natural-gas processing, and sewage treatment. The classic example of a heat exchanger is found in an internal combustion engine in which a circulating fluid known as engine coolant flows through radiator coils and air flows past the coils, which cools the coolant and heats the incoming air.

Types of heat exchangers include: shell and tube heat exchanger, plate heat exchangers, plate and shell heat exchanger, adiabatic wheel heat exchanger, plate fin heat exchanger, pillow plate heat exchanger, fluid heat exchanger, waste heat recovery units, dynamic scraped surface heat exchanger, phase-change heat exchangers, direct contact heat exchangers, microchannel heat exchangers.

One of the widest uses of heat exchangers is for air conditioning of buildings and vehicles. This class of heat exchangers is commonly called air coils, or just coils due to their often-serpentine internal tubing. Liquid-to-air, or air-to-liquid HVAC (i.e. heating, ventilation and air conditioning) coils are typically of modified crossflow arrangement. In vehicles, heat coils are often called heater cores.

On the liquid side of these heat exchangers, the common fluids are water, a water-glycol solution, steam, or a refrigerant. For heating coils, hot water and steam are the most common, and this heated fluid is supplied by boilers, for example. For cooling coils, chilled water and refrigerant are most common. Chilled water is supplied from a chiller that is potentially located very far away, but refrigerant must come from a nearby condensing unit. When a refrigerant is used, the cooling coil is the evaporator in the vapor-compression refrigeration cycle. HVAC coils that use this direct-expansion of refrigerants are commonly called DX coils. Some DX coils are "microchannel" type.

On the air side of HVAC coils a significant difference exists between those used for heating, and those for cooling. Air that is cooled often has moisture condensing out of it, except with extremely dry air flows. Heating some air increases that airflow's capacity to hold water. Thus, heating coils need not consider moisture condensation on their air-side. However, cooling coils are designed and selected to handle latent (moisture) as well as the adequate (cooling) loads. The water that is removed is called condensate.

With reference to FIG. 1, article 200 comprises substrate 210 comprising a (e.g. liquid and ice) repellent surface layer (e.g. layer) 251 disposed on a substrate. The repellent surface layer can comprise a (e.g. non-fluorinated) organic polymeric binder and a fluorochemical material. The concentration of fluorochemical material at the outer exposed surface 253 is typically higher than the concentration of fluorochemical material within the (e.g. non-fluorinated) organic polymeric binder layer 251 proximate substrate 210. The (e.g. liquid) repellent surface layer can be provided by coating substrate 210 with a coating composition comprising an organic solvent, a (e.g. non-fluorinated) organic polymeric binder, and a fluorochemical material; as will subsequently be described.

Figure 2:
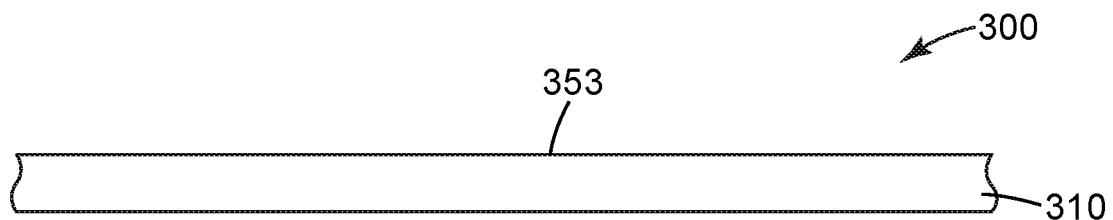
FIG. 2 is cross-sectional view of another embodiment of an article comprising a repellent surface.

With reference to FIG. 2, article 300 comprises substrate 310 comprising a (e.g. liquid) repellent surface (e.g. layer) 353 that comprises a fluorochemical material. The concentration of fluorochemical material at the outer exposed surface (e.g. layer) 353 is typically higher than the concentration of fluorochemical material proximate the center of the substrate 310. In one embodiment, the (e.g. liquid) repellent surface 353 can be provided by including a fluorochemical material, such as a fluorochemical compound, as a melt additive in a polymeric material that is thermally processed to form substrate 310 into a component or a surface layer thereof.

The repellent surface repels ice and typically also repels liquids such as water, aqueous solutions and mixtures including paint. The repellent surface also typically repels hydrophobic liquids such as hexadecane.

In some embodiments, the inclusion of the repellent surface can aid in the removal of ice accumulation from the repellent surface. For example, the inclusion of the repellent surface may reduce the force required to remove the ice from the repellent surface.

Further, the article may be capable of repeatedly releasing ice from the repellent surface.

In other embodiments, the inclusion of the repellent coating may reduce or prevent ice build-up on the repellent surface. The repellent coating or surface may also reduce the time required to remove ice which has formed on a substrate when the substrate is thawed/defrosted.

Ice repellency can be measured by various known methods, such as Centrifugal Testing (as conducted by AMIL) according to the test method described in the examples. In some embodiments, the repellent surface has an ice reduction factor (ARF) of at least 2 or 2.5. The ice reduction factor may range up to about 5 or greater. In some embodiments, the ice adhesion on bare aluminum is less than 325, 300, 275, 250, or 200 kPa. The ice adhesion may be at least 50 or 100 kPa.

The outer exposed surface 253 is preferably (e.g. ice, liquid) repellent such that the advancing and/or receding contact angle of the surface with water is least 90, 95, 100, 105, 110, or 115 degrees. The advancing and/or receding contact angle is typically no greater than 135, 134, 133, 132, 131 or 130 degrees and in some embodiments, no greater than 129, 128, 127, 126, 125, 124, 123, 122, 121, or 120 degrees. The difference between the advancing and/or receding contact angle with water of the (e.g. ice, liquid) repellent surface layer can be at least 5, 10, 15, 20, 25, 30, 35, 40, 45, or 50 degrees. In some embodiments, the difference between the advancing and receding contact angle with water of the surface layer is no greater than 15, 14, 13, 12, 11, 10, 9, 8, 7, 6, 5, 4, 3, 2, or 1 degree. As the difference between the advancing and receding contact angle with water increases, the tilt angle needed to slide or roll off a (e.g. water) droplet from a planar surface increases. One of ordinary skill appreciates that deionized water is utilized when determining contact angles with water.

In some embodiments, the outer exposed surface 253 exhibits a contact angle in the ranges just described after soaking in water for 24 hours at room temperature (25° C.). The contact angle of the (e.g. ice, liquid) repellent surface can also be evaluated with other liquids instead of water such as hexadecane or a solution of 10% by weight 2-n-butoxyethanol and 90% by weight deionized water. In some embodiments, the advancing contact angle with such 2-n-butoxyethanol solution is at least 60, 61, 62, 63, 64, 65, 66, 67, 68, 69, 70 degrees and in some embodiments at least 75 or 80 degrees. In some embodiments, the receding contact angle with such 2-n-butoxyethanol solution is at least 40, 45, 50, 55, 60, 65, or 70 degrees. In some embodiments, the advancing and/or receding contact angle of the (e.g. ice, liquid) repellent surface with such 2-n-butoxyethanol solution is no greater than 100, 95, 90, 85, 80, or 75 degrees.

In another embodiment, the outer exposed surface 253 is preferably (e.g. ice, liquid) repellent such that the receding contact angle of the surface with hexadecane is at least 45, 46, 47, 48, 49, 50, 55, 60, 65, 70, or 75 degrees. The advancing contact angle with hexadecane is typically at least 45, 50, 55, 60, 65, 70, 75, 80, or 84 degrees. In typical embodiments, the receding or advancing contact angle with hexadecane is no greater than 85 or 80 degrees. In some embodiments, the outer exposed surface 253 exhibits a contact angle in the ranges just described after soaking in water for 24 hours at room temperature (25° C.).

The surface layer is not a lubricant impregnated surface. Rather the outer exposed surface is predominantly a solid (e.g. ice, liquid) repellent material. In this embodiment, less than 50, 45, 40, 35, 30, 25, 20, 15, 10, 5, 4, 3, 2, 1, 0.5, 0.1, 0.005, 0.001% of the surface area is a liquid lubricant. Rather, at least 50, 55, 60, 65, 70, 75, 80, 85, 90, 95, 96, 97, 98, 99, 99.5%, or greater of the outer exposed surface is a solid repellent material, as described herein. Thus, a liquid (e.g. water, oil, paint) or solid (e.g. ice) that is being repelled comes in contact with and is repelled by the solid repellent material.

The repellent material is generally a solid at the use temperature of the coated substrate or article, which can be as low as −60° F. (−51.1° C.) or −80° F. (−62.2° C.), yet more typically ranges from −40° F. (−40° C.) to 120° F. (48.9° C.). For outdoor usage in moderate climates, the typical use temperature may be at least −20° F. (−28.9° C.), −10° F. (−23.3° C.), 0° F. (−17.8° C.), or 10° F. (−12.2° C.). In typical embodiments, the repellent material is a solid at room temperature (e.g. 25° C.) and temperatures ranging from 40° F. (4.44° C.) to 130° F. (54.4° C.). In typical embodiments the repellent material has a melting temperature (peak endotherm as measured by DSC) of greater than 25° C. and also typically greater than 130° F. (54.4° C.). In some embodiments, the repellent material has a melting temperature no greater than 200° C. In typical embodiments, a single solid repellent material is utilized. However, the coating composition may contain a mixture of solid repellent materials.

The repellent material has no solubility or only trace solubility with water, e.g., a solubility of 0.01 g/l or 0.001 g/l or less.

The (e.g. liquid, ice) repellent surface layer comprises a fluorochemical material and a (e.g. non-fluorinated) organic polymeric binder. In typical embodiments, a major amount of non-fluorinated polymeric binder is combined with a sufficient amount of fluorochemical material that provides the desired ice and liquid repellency properties, as previously described.

In typical embodiments, the amount of fluorochemical material is at least about 0.005, 0.10, 0.25, 0.5, 1.5, 2.0, or 2.5 wt.-% and in some embodiments, at least about 3.0, 3.5, 4.0, 4.5, or 5 wt.-%. The amount of fluorochemical material is typically no greater than 50, 45, 40, 35, 30, 25, 20, or 15 wt.-% of the sum of the fluorochemical material and (e.g., non-fluorinated) polymeric binder. Thus, the fluorine content of such fluorochemical material-containing polymeric (e.g. binder) materials is significantly less than the fluorine content of fluoropolymers, such as Teflon™ PTFE. The Teflon™ PTFE materials are polytetrafluoroethylene polymers prepared by the polymerization of the monomer tetrafluoroethylene ("TFE" having the structure $CF_2=CF_2$). It has been found that Teflon™ PTFE does not provide a highly repellent surface such that the receding contact angle with water is at least 90 degrees and/or difference between the advancing contact angle and the receding contact angle of water is less than 10. It is therefore a surprising result that materials containing such low fluorine content can provide comparable or better repellency than fluoropolymers such as Teflon™ PTFE having a substantially higher fluorine content.

In some embodiments, the fluorochemical material comprises a compound or a mixture of compounds represented by the formula:

$$(R_f\text{-L-P})_n A$$

$R_f$ is a fluorinated group;
L is independently an organic divalent linking group;
P is independently a catenary, divalent heteroatom-containing a carbonyl moiety;
A is hydrocarbon moiety;
and n typically ranges from 1 to 3.

In some embodiments, n is preferably 2 or averages at least 2. When the fluorochemical material comprises a mixture of compounds, the concentration by weight of the fluorochemical compound wherein n is 2 is typically greater than each of the fractions wherein n is not 2 (e.g. n=1 or n=3). Further, the concentration wherein n is 2 is typically at least 50%, 55%, 60%, 65%, 70%, 75%, 80%, 85%, 90%, or 95% by weight or greater of the mixture of compounds.

The fluorinated group, $R_f$, is typically a fluoroalkyl group that contains at least 3 or 4 carbon atoms and typically no greater than 12, 8, or 6 carbon atoms. The fluoroalkyl group can be straight chain, branched chain, cyclic or combinations thereof. In typical embodiments, the fluoroalkyl group is preferably free of olefinic unsaturation. In some embodiments, each terminal fluorinated group contains at least 50, 55, 60, 65, or 70% to 78% fluorine by weight. Such terminal groups are typically perfluorinated. In some embodiments, $R_f$ is $CF_3(CF_2)_3$—or in other words $C_4F_9$—for at least 50%, 55%, 60%, 65%, 70%, 75%, 80%, 85%, 90%, or 95% by weight or greater of the mixture of compounds. In another embodiment, the fluorinated group, $R_f$, is a perfluoroheteroalkyl group, such as a perfluoroether or perfluoropolyether.

The organic divalent linking group, L, can be a covalent bond, a heteroatom (e.g., O or S), or an organic moiety. The organic divalent linking group typically contains no greater than 20 carbon atoms, and optionally contains oxygen-, nitrogen-, or sulfur-containing groups or a combination thereof. L is typically free of active hydrogen atoms. Examples of L moieties include straight chain, branched chain, or cyclic alkylene, arylene, aralkylene, oxy, thio, sulfonyl, amide, and combinations thereof such as sulfonamidoalkylene. Below is a representative list of suitable organic divalent linking groups.

—$SO_2N(R')(CH_2)_k$—
—$CON(R')(CH_2)_k$—
—$(CH_2)_k$—
—$(CH_2)_kO(CH_2)_k$—
—$(CH_2)_kS(CH_2)_k$—
—$(CH_2)_kSO_2(CH_2)_k$—
—$(CH_2)_kOC(O)NH$—
—$(CH_2)SO_2N(R')(CH_2)_k$—
—$(CH_2)_kNR'$—
—$(CH_2)_kNR'C(O)NH$—

For the purpose of this list, each k is independently an integer from 1 to 12. R' is hydrogen, phenyl, or an alkyl of 1 to about 4 carbon atoms (and is preferably methyl). In some embodiments, k is no greater than 6, 5, 4, 3, or 2. In some embodiments, the linking group has a molecular weight of at least 14 g/mole, in the case of —$CH_2$—, or at least 20, 25, 30, 40, 50, 60, 70, 80, 90, 100, or 110 g/mole. The molecular weight of the linking group is typically no greater than 350 g/mole and in some embodiments no greater than 300, 250, 200, or 150 g/mole.

The aforementioned moiety, A, can be a straight chain, branched chain, or cyclic hydrocarbon, or a combination thereof. Typical A moieties include alkylene, alkene, arylene, and aralkylene having 4-50 carbon atoms. In some embodiments, A is preferably a saturated hydrocarbon moiety or in other words an alkylene group (i.e. when n is 2 or 3) or alkyl group (i.e. when n is 1) averaging at least 4, 6, 8, 10, 12, 14, 16, or 18 carbon atoms. In some embodiments, the alkylene or alkyl group averages no greater than 45, 40, 35, 30, 25, or 20 carbon atoms. In typical embodiments, A is a hydrocarbon portion of a dicarboxylic acid or fatty acid.

The divalent carbonyl moiety, P, is typically a residue of a dicarboxylic or fatty acid and thus carbonyloxy (—C(O)O—) or in other words an ester group.

The fluorochemical compound can be prepared by various methods known in the art such as described in U.S. Pat. No. 6,171,983. The fluorochemical is most typically prepared by esterifying a fluorinated alcohol with a dicarboxylic acid or a fatty acid. Particularly when a fatty acid is utilized as a starting material the resulting fluorochemical material typically contains a mixture of compounds.

Suitable dicarboxylic acids include adipic acid, suberic acid, azelaic acid, dodecanedioic acid, octadecanedioic acid, eicosanedioic acid, and the like that provide the A group as previously described. Derivatives of dicarboxylic acid can also be employed such as halides and anhydrides.

Suitable unsaturated fatty acids include for example-palmitoleic acid, linoleic acid, linolenic acid, oleic acid, rinoleic acid, gadoleic acid, eracic acid or mixtures thereof. Polymerized fatty acids can contain a higher number of carbon atoms such that the fluorochemical compound averages 30, 35, 40, 45 or 50 carbon atoms.

Suitable saturated fatty acids include caprylic acid, $CH_3(CH_2)_6COOH$; capric acid, $CH_3(CH_2)_8COOH$; lauric acid, $CH_3(CH_2)_{10}COOH$; myristic acid, $CH_3(CH_2)_{12}COOH$; palmitic $CH_3(CH_2)_{14}COOH$; stearic acid $CH_3(CH_2)_{16}COOH$; arachidic acid, $CH_3(CH_2)_{18}COOH$; behenic acid $CH_3(CH_2)_{20}COOH$; lignoceric acid, $CH_3(CH_2)_{22}COOH$; and cerotic acid $CH_3(CH_2)_{24}COOH$.

Representative examples of useful fluorine-containing monoalcohols include the following wherein $R_f$ is a fluorinated group as previously described.

| | |
|---|---|
| $R_fSO_2N(CH_3)CH_2CH_2OH$, | $CF_3(CF_2)_3SO_2N(CH_3)CH_2CH_2OH$, |
| $CF_3(CF_2)_3SO_2N(CH_3)CH(CH_3)CH_2OH$, | $CF_3(CF_2)_3SO_2N(CH_3)CH_2CH(CH_3)OH$, |
| $C_3F_7CH_2OH$, | $R_fSO_2N(H)(CH_2)_2OH$, |
| $R_fSO_2N(CH_3)(CH_2)_4OH$, | $C_4F_9SO_2N(CH_3)(CH_2)_4OH$ |
| $C_6F_{13}SO_2N(CH_3)(CH_2)_4OH$, | $R_fSO_2N(CH_3)(CH_2)_{11}OH$, |
| $R_fSO_2N(C_2H_5)CH_2CH_2OH$, | $CF_3(CF_2)_3SO_2N(C_2H_5)CH_2CH_2OH$, |
| $C_6F_{13}SO_2N(C_2H_5)CH_2CH_2OH$ | $R_fSO_2N(C_2H_5)(CH_2)_6OH$, |

C₃F₇CONHCH₂CH₂OH,
R₍SO₂N(CH₂CH₂CH₃)CH₂CH₂OH,
R₍SO₂N(C₄H₉)CH₂CH₂OH,
R₍SO₂N(C₃H₇)CH₂OCH₂CH₂OH,
R₍SO₂N(C₄H₉)(CH₂)₄OH,

Other fluorine-containing monoalcohols are described in U.S. Pat. No. 6,586,522; incorporated herein by reference.

In some embodiments, the monofunctional fluoroaliphatic alcohols useful in preparing the fluorochemical compounds include the N-alkanol perfluoroalkylsulfonamides described in U.S. Pat. No. 2,803,656 (Ahlbrecht et al.), which have the general formula R₍SO₂ N(R)R₁ CH₂ OH wherein R₍ is a perfluoroalkyl group having 3 to 6 and preferably 4 carbon atoms, R₁ is an alkylene radical having 1 to 12 carbon atoms, and R is a hydrogen atom or an alkyl group containing 1 to 4 carbon atoms and is preferably methyl. In some embodiments, R₁ is an alkylene radical having no greater than 8, 7, 6, 5, 4, 3, or 2 carbon atoms. These monofunctional alcohols can be prepared by reactions of an acetate ester of halohydrin with a sodium or potassium salt of the corresponding perfluoroalkylsulfonamide.

In some embodiments, the fluorochemical compound has the following formulas

C₄F₉SO₂N(CH₃)(CH₂)ₖOC(O)-A-C(O)O(CH₂)ₖN(CH₃)SO₂C₄F₉ or

C₄F₉SO₂N(CH₃)(CH₂)ₖOC(O)-A wherein k and A are the same as previously described.

In some typical embodiments, the fluorochemical compound comprises less than 2% of fluorinated groups having greater than 6 carbon atoms. Further, the fluorochemical compound typically comprises less than 25% of fluorinated groups having greater than 4 carbon atoms. In favored embodiments, the fluorochemical compound is free of fluorinated (e.g. fluoroalkyl) groups, R₍, having at least 8 carbon atoms. In some embodiments, the fluorochemical compound is free of fluorinated (e.g. fluoroalkyl) groups, R₍, having at least 5, 6, or 7 carbon atoms. In some embodiments, the repellent surface or repellent coating is free of fluorinated (e.g. fluoroalkyl) groups, R₍, having at least 8 carbon atoms. In some embodiments, the repellent surface or repellent coating is free of fluorinated (e.g. fluoroalkyl) groups, R₍, having at least 5, 6, or 7 carbon atoms.

Fluorochemical compounds according to the formulas described herein are not fluoroalkyl silsesquioxane materials having the chemical formula [RSiO₃/₂]ₙ, wherein R comprises a fluoroalkyl or other fluorinated organic group. Fluorochemical compounds according to the formulas described herein are also not (e.g. vinyl terminated) polydimethylsiloxanes. In typical embodiments, the fluorochemical material is free of silicon atoms as well as siloxane linkages.

In some embodiments, the (e.g. starting materials of the) fluorochemical compound are selected such that the) fluorochemical compound has a molecular weight (Mw) no greater than 1500, 1400, 1300, 1200, 1100, or 1000 g/mole. In some embodiments the molecular weight is at least 250, 300, 350, 400, 450, 500, 550, 600, or 700 g/mole.

In some embodiments, the (e.g. starting materials of the) fluorochemical compound are selected such that the) fluorochemical compound has a fluorine content of at least 25 wt.-%. In some embodiments, the fluorine content of the fluorochemical material is at least 26, 27, 28, 29, 30, 31, 32, 33, or 34 wt.-% and typically no greater than 58, 57, 56, 55, 54, 53, 52, 51, or 50 wt.-%.

Various organic polymeric binders can be utilized. Although fluorinated organic polymeric binders can also be utilized, fluorinated organic polymeric binders are typically considerably more expensive than non-fluorinated binders. Further, non-fluorinated organic polymeric binders can exhibit better adhesion to non-fluorinated polymeric, metal, or other substrates.

Suitable non-fluorinated binders include for example polystyrene, atactic polystyrene, acrylic (i.e. poly(meth)acrylate), polyester, polyurethane (including polyester type thermoplastic polyurethanes "TPU"), polyolefin (e.g. polyethylene), and polyvinyl chloride. Many of the polymeric materials that a substrate can be thermally processed from, as will subsequently be described, can be used as the non-fluorinated organic polymeric binder of the organic solvent coating composition. However, in typical embodiments, the non-fluorinated organic polymeric binder is a different material than the polymeric material of the substrate. In some embodiments, the organic polymeric binder typically has a receding contact angle with water of less than 90, 80, or 70 degrees. Thus, the binder is typically not a silicone material.

In some embodiments, the (e.g. non-fluorinated) organic polymeric binder is a film-grade resin, having a relatively high molecular weight. Film-grade resins can be more durable and less soluble in the liquid/solid (e.g. water, oil, paint, ice) being repelled. In other embodiments, the (e.g. non-fluorinated) organic polymeric binder can be a lower molecular weight film-forming resin. Film-forming resins can be more compliant and less likely to affect the mechanical properties of the substrate. Viscosity and melt flow index are indicative of the molecular weight. Mixtures of (e.g. non-fluorinated) organic polymeric binders can also be used.

In some embodiments, the film-grade (e.g. non-fluorinated) organic polymeric binder typically has a melt flow index of at least 1, 1.5, 2, 2.5, 3, 4, or 5 g/10 min at 200° C./5 kg ranging up to 20, 25, or 30 g/10 min at 200° C./5 kg. The melt flow index can be determined according to ASTM D-1238. The tensile strength of the (e.g. non-fluorinated) organic polymeric binder is typically at least 40, 45, 50, 55, or 60 MPa. Further, the (e.g. non-fluorinated) organic polymeric binder can have a low elongation at break of less than 10% or 5%. The tensile and elongation properties can be measured according to ASTM D-638.

In other embodiments, the (e.g. non-fluorinated) organic polymeric binders have a lower molecular weight and lower tensile strength than film-grade polymers. In one embodiment, the melt viscosity of the (e.g. non-fluorinated) organic polymeric binders (as measured by ASTM D-1084-88) at 400° F. (204° C.) ranges from about 50,000 to 100,000 cps. In another embodiment, the molecular weight (Mw) of the (e.g. non-fluorinated) organic polymeric binder is typically at least about 1000, 2000, 3000, 4000, or 5000 g/mole ranging up to 10,000; 25,000; 50,000; 75,000; 100,000; 200,000; 300,000; 400,000, or 500,000 g/mole. In some embodiments, the (e.g. non-fluorinated) organic polymeric binder has a tensile strength of at least 5, 10, or 15 MPa ranging up to 25, 30, or 35 MPa. In other embodiments, the (e.g. non-fluorinated) organic polymeric binder has a tensile strength of at least 40, 45, or 50 MPa ranging up to 75 or 100 MPa. In some embodiments, the (e.g. non-fluorinated) organic polymeric binder has an elongation at break ranging up to 25, 50, 100, 200, 300, 400, 500, 600, 700, 800, 900, 1000% or higher. In some embodiments, the (e.g. non-fluorinated) organic polymeric binder has a Shore A hardness of at least 50, 60, 70, or 80 ranging up to 100.

In some embodiments, the (e.g. non-fluorinated) organic polymeric binder is selected such that it is compliant at the use temperature of the coated substrate or article. In this embodiment, the (e.g. non-fluorinated) organic polymeric binder has a glass transition temperature (Tg) as can be measured by DSC of less than 0° C. or 32° F. In some embodiments, the (e.g. non-fluorinated) organic polymeric binder has a glass transition temperature (Tg) of less than 20° F. (−6.7° C.), 10° F. (−12.2° C.), 0° F. (−17.8° C.), −10° F. (−23.3° C.), −20° F. (−28.9° C.), −30° F. (−34.4° C.), −40° F. (−40° C.), −50° F. (−45.6° C.), −60° F. (−51.1° C.), −70° F. (−56.7° C.), or −80° F. (−62.2° C.). The (Tg) of many (e.g. non-fluorinated) organic polymeric binders is at least −130° C.

The selection of (e.g. non-fluorinated) organic polymeric binder contributes to the durability of the repellent surface.

In typical embodiments, the non-fluorinated organic polymeric binder does not form a chemical (e.g. covalent) bond with the fluorochemical material as this may hinder the migration of the fluorochemical material to the outermost surface layer.

In some embodiments, the (e.g. non-fluorinated) organic polymeric binder is not curable, such as in the case of alkyd resins. An alkyd resin is a polyester modified by the addition of fatty acids and other components, derived from polyols and a dicarboxylic acid or carboxylic acid anhydride. Alkyds are the most common resin or "binder" of most commercial "oil-based" paints and coatings.

In some embodiments, the selection of the non-fluorinated polymeric binder can affect the concentration of fluorochemical material that provides the desired (e.g. liquid, ice) repellency properties. For example when the binder is atactic polystyrene, having a molecular weight of 800-5000 kg/mole, or polystyrene available under the trade designation "Styron 685D", the concentration of fluorochemical material was found to exceed 2.5 wt.-% in order to obtain the desired repellency properties. Thus, for some non-fluorinated polymeric binders, the concentration of fluorochemical material may be at least 3, 3.5, 4, or 5 wt.-% of the total amount of fluorochemical material and (e.g. non-fluorinated) polymeric binder.

Further, when the binder is PMMA, i.e. polymethylmethacrylate, (available from Alfa Aesar) 50 wt.-% of fluorochemical material resulted in a receding contact angle with water of 86 degrees. However, lower concentrations of fluorochemical material resulted in a receding contact angle with water of greater than 90 degrees. Thus, for some non-fluorinated polymeric binders, the concentration of fluorochemical material may be less than 50 wt.-% of the total amount of fluorochemical material and (e.g. non-fluorinated) polymeric binder.

The compositions comprising a fluorochemical material and a (e.g., non-fluorinated organic) polymeric binder can be dissolved, suspended, or dispersed in a variety of organic solvents to form a coating composition suitable for use in coating the compositions onto a substrate. The organic solvent coating compositions typically contain at least about 70%, 80%, 90%, 91%, 92%, 93%, 94%, 95%, 96%, 97%, 98%, 99% organic solvent or greater, based on the total weight of the coating composition. The coating compositions typically contain at least about 0.01%, 0.1%, 0.5%, 1%, 2%, 3%, 4%, 5%, 6%, 7%, 8%, 9%, 10%, 15% or greater solids of the (e.g. non-fluorinated organic) polymeric binder and fluorochemical material, based on the total weight of the coating composition. However, the coating composition can be provided with an even higher amount of solids, e.g. 20, 30, 40, or 50 wt.-% solids. Suitable organic solvents include for example alcohols, esters, glycol ethers, amides, ketones, hydrocarbons, chlorohydrocarbons, hydrofluorocarbons, hydrofluoroethers, chlorocarbons, and mixtures thereof.

The coating composition may contain one or more additives provided the inclusion of such does not detract from the (e.g. liquid, ice) repellent properties.

The coating compositions can be applied to a substrate or article by standard methods such as, for example, spraying, padding, dipping, roll coating, brushing, or exhaustion (optionally followed by the drying of the treated substrate to remove any remaining water or organic solvent). The substrate can be in the form of sheet articles that can be subsequently thermally formed into a substrate or component. When coating flat substrates of appropriate size, knife-coating or bar-coating may be used to ensure uniform coating of the substrate.

The moisture content of the organic coating composition is preferably less than 1000, 500, 250, 100, 50 ppm. In some embodiments, the coating composition is applied to the substrate at a low relative humidity, e.g. of less than 40%, 30% or 20% at 25° C.

The coating compositions can be applied in an amount sufficient to achieve the desired repellency properties. Coatings as thin as 250, 300, 350, 400, 450, or 500 nm ranging up to 1, 1.5, 2, 2.5, 3, 3.5, 4, 4.5, or 5 microns can provide the desired repellency. However, thicker coatings (e.g., up to about 10, 15, 20 microns or more) can also be used. Thicker coatings can be obtained by applying to the substrate a single thicker layer of a coating composition that contains a relatively high solids concentration. Thicker coatings can also be obtained by applying successive layers to the substrate.

In another embodiment, the fluorochemical material can be combined with a thermally processible (e.g. thermoplastic) polymer and then melt processed into an article, substrate thereof, or surface layer thereof. In this embodiment, the fluorochemical material typically migrates to the surface forming a surface layer with a high concentration of fluorochemical material relative to the total amount of fluorochemical material and thermally processible polymer.

In typical embodiments, the amount of fluorochemical material melt additive is at least about 0.05, 0.1, 0.25, 0.5, 1.5, 2.0 or 2.5 wt.-% and in some embodiments, at least about 3.0, 3.5, 4.0, 4.5 or 5 wt.-%. The amount of fluorochemical material is typically no greater than 25, 20, 15, or 10 wt.-% of the sum of the fluorochemical material melt additive and thermally processible polymer.

To form a polymer blend by melt processing, the fluorochemical material can be, for example, mixed with pelletized, granular, powdered or other forms of the thermally processible polymer and then melt processed by known methods such as, for example, molding or melt extrusion. The fluorochemical material can be mixed directly with the polymer or it can be mixed with the polymer in the form of a "master batch" (concentrate) of the fluorochemical material in the polymer. If desired, an organic solution of the fluorochemical material can be mixed with powdered or pelletized polymer, followed by drying (to remove solvent) and then melt processing. Alternatively, the fluorochemical composition can be added to the polymer melt to form a mixture or injected into a molten polymer stream to form a blend immediately prior to extrusion or molding into articles.

In some embodiments, the melt processible (e.g. thermoplastic) polymer is a polyolefin, polyester, polyamide, polyurethane, or polyacrylate.

The fluorochemical (e.g. melt additive) materials are generally a solid at room temperature (e.g. 25° C.) and at the use temperature of the spray application system component, which commonly ranges from 40° F. (4.4° C.) to 120° F. (48.9° C.). The fluorochemical material and thermally processible polymer are selected such that the fluorochemical material and/or siloxane material is typically molten at the melt processing temperature of the mixture. In some embodiments, the fluorochemical material has a melt temperature no greater than 200, 190, 180, 170, or 160° C.

Extrusion can be used to form polymeric films. In film applications, a film forming polymer is simultaneously melted and mixed as it is conveyed through the extruder by a rotating screw or screws and then is forced out through a slot or flat die, for example, where the film is quenched by a variety of techniques known to those skilled in the art. The films optionally are oriented prior to quenching by drawing or stretching the film at elevated temperatures. Adhesive can optionally be coated or laminated onto one side of the extruded film in order to apply and adhere the (liquid, ice) repellent film onto a substrate.

Molded articles are produced by pressing or by injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally heat-treated to effect migration of the polymer additives to the surface of the article.

After melt processing, an annealing step can be carried out to enhance the development of repellent characteristics. The annealing step typically is conducted below or above the melt temperature of the polymer for a sufficient period of time. The annealing step can be optional.

The (e.g. liquid, ice) repellent coating composition can be provided on a wide variety of organic or inorganic substrates.

Suitable polymeric materials for substrates include, but are not limited to, polyesters (e.g., polyethylene terephthalate or polybutylene terephthalate), polycarbonates, acrylonitrile butadiene styrene (ABS) copolymers, poly(meth)acrylates (e.g., polymethylmethacrylate, or copolymers of various (meth)acrylates), polystyrenes, polysulfones, polyether sulfones, epoxy polymers (e.g., homopolymers or epoxy addition polymers with polydiamines or polydithiols), polyolefins (e.g., polyethylene and copolymers thereof or polypropylene and copolymers thereof), polyvinyl chlorides, polyurethanes, fluorinated polymers, cellulosic materials, derivatives thereof, and the like. In some embodiments, where increased transmissivity is desired, the polymeric substrate can be transparent. The term "transparent" means transmitting at least 85 percent, at least 90 percent, or at least 95 percent of incident light in the visible spectrum (wavelengths in the range of 400 to 700 nanometers). Transparent substrates may be colored or colorless.

Suitable inorganic substrates include metals and siliceous materials such as glass. Suitable metals include pure metals, metal alloys, metal oxides, and other metal compounds. Examples of metals include, but are not limited to, chromium, iron, aluminum, silver, gold, copper, nickel, zinc, cobalt, tin, steel (e.g., stainless steel or carbon steel), brass, oxides thereof, alloys thereof, and mixtures thereof.

The coating composition can be used to impart or enhance (e.g. ice, aqueous liquid and/or oil) repellency of a variety of substrates and articles. The term "ice" includes any form of frozen water as previously described.

The term "aqueous" means a liquid medium that contains at least 50, 55, 60, 65, or 70 wt-% of water. The liquid medium may contain a higher amount of water such as at least 75, 80, 85, 90, 95, 96, 97, 98, 99, or 100 wt-% water. The liquid medium may comprise a mixture of water and one or more water-soluble organic cosolvent(s), in amounts such that the aqueous liquid medium forms a single phase. Examples of water-soluble organic cosolvents include for example methanol, ethanol, isopropanol, 2-methoxyethanol, (2-methoxymethylethoxy)propanol, 3-methoxypropanol, 1-methoxy-2-propanol, 2-butoxyethanol, ethylene glycol, ethylene glycol mono-2-ethylhexylether, tetrahydrofuran, 2,2,4-trimethyl-1,3-pentanediol monoisobutyrate, tetraethylene glycol di(2-ethylhexoate), 2-ethylhexylbenzoate, and ketone or ester solvents. The amount of organic cosolvent does not exceed 50 wt-% of the total liquids of the coating composition. In some embodiments, the amount of organic cosolvent does not exceed 45, 40, 35, 30, 25, 20, 15, 10 or 5 wt-% organic cosolvent. Thus, the term aqueous includes (e.g. distilled) water as well as water-based solutions and dispersions such as paint. Water-based solutions and dispersions may be used as test liquids for evaluating contact angles.

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

| Material designation | Description | Obtained from |
|---|---|---|
| MEK | Methyl ethyl ketone | Avantor Performance Materials, Center Valley, PA |
| MIBK | Methyl isobutyl ketone | |
| Acetone | Acetone | VWR International, Radnor, PA |
| MDI | Methylene diphenyldiisocyanate | Bayer, Germany |
| DMF | Dimethylformamide | VWR International, Radnor, PA |
| Capa 2100 | Linear polyester diol under trade designation "CAPA 2100" | Perstorp Holding AB, Malmo, Sweden |
| 1,4-butane diol | 1,4-butane diol | Sigma-Aldrich Chemical Company, St. Louis, MO |
| PS | Atactic polystyrene beads with formula weights of 800-5000 g/mol ($PS_5$) or 125-250 kg/mol ($PS_{250}$), | Alfa Aesar, Ward Hill, MA |
| Styron 685D | Polystyrene resin beads | American Styrenics, The Woodlands, TX |
| PMMA | Poly(methyl methacrylate) (PMMA) powder with a melting point >150° C. | Alfa Aesar, Ward Hill, MA |

| Material designation | Description | Obtained from |
|---|---|---|
| PVC | Poly(vinylchloride) with an inherent viscosity of 1.115 dL/g. | Aldrich Chemical Co., Milwaukee, WI |
| Elvacite 1010 | Acrylic resin, under trade designation "ELVACITE 1010" | Lucite International, Mississauga, Ontario, Canada |
| TPU2 | Polyurethane resin, under trade designation "ESTANE 5703" | Lubrizol Advanced Materials, Inc., Cleveland, OH |
| TPU3 | Polyurethane resin, under trade designation "ESTANTE ALR CL87A" | Lubrizol Advanced Materials, Inc., |
| Unicid 350 | Long chain, linear primary carboxylic acid, under trade designation "UNICID 350" | Baker Hughes Inc., Houston, TX |

Synthesis of Fluorochemical Material 1 (FC-1)

MEFBSE ($C_4F_9SO_2N(CH_3)C_2H_4OH$), a fluorochemical alcohol having an equivalent weight of 357, was made in two stages by reacting perfluorobutanesulfonyl fluoride (PBSF) with methylamine to form MEFBSA ($C_4F_9SO_2N(CH_3)H$), followed by reaction with ethylenechlorohydrin, using a procedure essentially as described in Example 1 of U.S. Pat. No. 2,803,656 (Ahlbrecht, et al.).

Fluorochemical 1 was then prepared using the protocol described in U.S. Pat. No. 7,396,866 (Jariwala et al) by esterifying the MEFBSE with octadecanedioic acid at a molar ratio of 2:1 as follows: to a three-necked round bottom flask was added 25 g (0.0793 moles) of Emerox 118 (available from Cognis Corporation, Cincinnati, Ohio). 56.7 g (0.159 moles) of MEFBSE, 100 g toluene and 1 g (0.007 moles) of 70 wt % solution of methanesulfonic acid. The contents of the flask were refluxed using a Dean-Stark trap and a condenser at 112° C. for 12 h. The solution was then cooled to 80° C. To this solution was added 1.08 g (0.007 moles) of triethanol amine and the solution was stirred at 80° C. for 1 h. This toluene solution was then washed with 75 g hot water (80° C.) three times. After the last wash the organic bottom layer was distilled to remove the toluene. The residue remaining the flask was the diester product, which was poured into a jar and allowed to crystallize on cooling to room temperature.

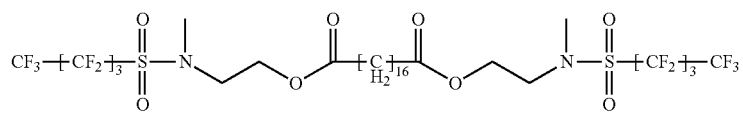

Synthesis of Fluorochemical Material 2 (FC-2)

Fluorochemical 2 was made by the esterification of a long chain hydrocarbon acid (Unicid 350, C25 average), and MEFBSE ($C_4F_9SO_2N(CH_3)C_2H_4OH$) in the same manner as the synthesis of Fluorochemical 1.

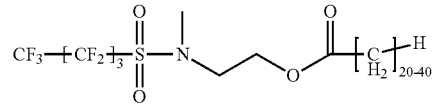

Synthesis of Polyurethane TPU1

100 g Capa 2100 was mixed with 50.02 g MDI in a 500 mL round-bottomed flask and heated up to 70° C. for 2 h. Next, 200 g of DMF and 8.11 g of 1,4-butane diol were added. The reactants were heated for an additional 3 h to obtain the thermoplastic urethane polymer. The polymer mixture is approximately 44% solids in DMF. Prior to coating, the mixture was diluted to 20% solids with DMF, then further diluted to either 4 or 5% solids with MEK, as noted in the Tables, below.

Methods

Method for Contact Angle Measurements

Water and hexadecane contact angles were measured using a Rama-Hart goniometer (Ramé-Hart Instrument Co., Succasunna, N.J.). Advancing ($\theta_{adv}$) and receding ($\theta_{rec}$) angles were measured as the test liquid (e.g. water or hexadecane) was supplied via a syringe into or out of sessile droplets (drop volume ~5 μL). Measurements were taken at 2 different spots on each surface, and the reported measurements are the averages of the four values for each sample (a left-side and right-side measurement for each drop).

Preparative Examples 1-39 (PE1-PE39)

PE1-PE39 were mixed to prepare coating solutions containing polymeric binder and fluorinated additives to be used in the Examples and Comparative Examples described below.

To prepare PE1-PE39 coating solutions, 2 g of FC-1 or FC-2 powder and 48 g of solvent (one of MEK, MIBK, DMF or mixtures thereof) were added to a jar. This mixture was stirred and heated to 60° C. until the solid powder dissolved and was no longer visible. This hot coating solution was mixed at the appropriate ratio with a 60° C. solution of binder polymer in solvent (one of MEK, MIBK, DMF or mixtures thereof). The polymeric binder/fluorinated additive solutions were then cooled to room temperature. The compositions of coating solutions of PE1-PE39 are summarized in Table 1, below. Note: Teflon AF was purchased, not made.

TABLE 1

| Preparative Example | Polymeric Binder | Fluorinated Additive | Polymeric Binder/ Fluorinated Additive Weight Ratio | Solvent | Weight % Solids |
|---|---|---|---|---|---|
| PE1 | Styron 685D | — | 100/0 | MEK | 4 |
| PE2 | Styron 685D | FC-1 | 97.5/2.5 | MEK | 4 |
| PE3 | Styron 685D | FC-1 | 95/5 | MEK | 4 |
| PE4 | Styron 685D | FC-1 | 90/10 | MEK | 4 |
| PE5 | Styron 685D | FC-1 | 85/15 | MEK | 4 |
| PE6 | Styron 685D | FC-1 | 95/5 | MIBK | 4 |
| PE7 | $PS_5$ | FC-1 | 99/1 | MEK | 4 |
| PE8 | $PS_5$ | FC-1 | 97.5/2.5 | MEK | 4 |
| PE9 | $PS_5$ | FC-1 | 95/5 | MEK | 4 |
| PE10 | $PS_5$ | FC-1 | 90/10 | MEK | 4 |
| PE11 | $PS_5$ | FC-1 | 85/15 | MEK | 4 |
| PE12 | $PS_{250}$ | FC-1 | 95/5 | MEK | 4 |
| PE13 | $PS_{250}$ | FC-2 | 95/5 | MEK | 4 |
| PE14 | PMMA | FC-1 | 95/5 | MEK | 4 |
| PE15 | Elvacite 1010 | FC-1 | 95/5 | MEK | 4 |
| PE16 | PVC | FC-1 | 95/5 | MEK | 4 |
| PE17 | TPU2 | FC-1 | 95/5 | MEK | 5 |
| PE18 | Teflon ® AF | — | 100/0 | 3M FC40 | 1 |
| PE19 | Comparative Binder - $PS_{250}$ | — | 100/0 | MEK | 4 |
| PE20 | Comparative Binder - $PS_5$ | — | 100/0 | MEK | 4 |
| PE21 | Comparative Binder - PMMA | — | 100/0 | MEK | 4 |
| PE22 | Comparative Binder - Elvacite 1010 | — | 100/0 | MEK | 4 |
| PE23 | Comparative Binder - PVC | — | 100/0 | MEK | 4 |
| PE24 | Comparative Binder - TPU2 | — | 100/0 | MEK | 4 |
| PE25 | $PS_{250}$ | FC-2 | 90/10 | MEK | 4 |
| PE26 | $PS_{250}$ | FC-2 | 85/15 | MEK | 4 |
| PE27 | — | FC-1 | 0/100 | MEK | 4 |
| PE28 | — | FC-2 | 0/100 | MEK | 4 |
| PE29 | PMMA | FC-2 | 95/5 | MEK | 4 |
| PE30 | PMMA | FC-2 | 90/10 | MEK | 4 |
| PE31 | Elvacite 1010 | FC-2 | 95/5 | MEK | 4 |
| PE32 | PVC | FC-2 | 95/5 | MEK | 4 |
| PE33 | TPU1 | FC-2 | 95/5 | MEK/DMF | 4 |
| PE34 | TPU1 | FC-1 | 95/5 | MEK/DMF | 4 |
| PE35 | TPU1 | FC-2/FC-1 | 94/3/3 | MEK/DMF | 4.5 |
| PE36 | TPU2 | — | 100/0 | MEK | 5 |
| PE37 | TPU2 | FC-1 | 97.5/2.5 | MEK | 4 |
| PE38 | TPU2 | FC-1 | 99/1 | MEK | 4 |
| PE39 | TPU2 | FC-1 | 92.5/7.5 | MEK | 4 |

Examples 1-30 (EX1-EX30) and Comparative Examples 1-11 (CE1-CE11)

Glass microscope slides (7.5×5.0 cm with a thickness of 0.1 cm, obtained from Fisher) were cleaned with acetone and wiped dry with a WYPALL paper towel. The cleaned glass slides were place on a flat surface and approximately 0.5 mL of each coating composition was evenly coated onto the cleaned glass microscope slide by means of a #52 Mayer rod and dried for approximately 2 h at 21° C. This process provides a coating that is about 133 microns initially and about 5 microns after evaporation of the solvent.

CE8 was a bare PTFE sheet obtained from ePlastics (San Diego, Calif.) and was used as the substrate without any coating.

Water contact angles were evaluated as summarized in Table 2, below.

TABLE 2

| Example | Preparative Example of Previous Table | Water Contact Angles in Degrees | | |
|---|---|---|---|---|
| | | $\theta_{adv}$ | $\theta_{rec}$ | CAH ($\theta_{adv} - \theta_{rec}$) |
| CE1 | PE1 | 93 | 74 | 19 |
| EX1 | PE2 | 110 | 103 | 7 |
| EX2 | PE3 | 112 | 105 | 7 |
| EX3 | PE4 | 114 | 106 | 8 |
| EX4 | PE5 | 114 | 112 | 2 |
| EX5 | PE6 | 116 | 110 | 6 |
| EX6 | PE7 | 103 | 93 | 10 |
| EX7 | PE8 | 117 | 116 | 1 |
| EX8 | PE9 | 114 | 106 | 8 |
| EX9 | PE10 | 116 | 108 | 8 |
| EX10 | PE11 | 116 | 108 | 8 |
| EX11 | PE12 | 118 | 112 | 6 |
| EX12 | PE13 | 120 | 112 | 8 |
| EX13 | PE14 | 115 | 107 | 8 |
| EX14 | PE15 | 117 | 109 | 8 |
| EX15 | PE16 | 120 | 119 | 1 |

TABLE 2-continued

| Example | Preparative Example of Previous Table | Water Contact Angles in Degrees | | |
|---|---|---|---|---|
| | | $\theta_{adv}$ | $\theta_{rec}$ | CAH ($\theta_{adv} - \theta_{rec}$) |
| EX16 | PE17 | 120 | 111 | 9 |
| EX17 | PE18 | 116 | 107 | 9 |
| CE2 | PE19 | 103 | 82 | 21 |
| CE3 | PE20 | 91 | 72 | 19 |
| CE4 | PE21 | 74 | 57 | 17 |
| CE5 | PE22 | 71 | 55 | 16 |
| CE6 | PE23 | 87 | 64 | 23 |
| CE7 | PE24 | 86 | 45 | 41 |
| EX18 | PE25 | 121 | 102 | 19 |
| EX19 | PE26 | 121 | 109 | 12 |
| CE8 | PTFE Sheet | 111 | 87 | 24 |
| CE9 | PE27 | — | — | — |
| CE10 | PE28 | 136° | 87° | 49° |
| EX20 | PE29 | 119° | 111° | 8° |
| EX21 | PE30 | 121° | 115° | 6° |
| EX23 | PE31 | 119° | 114° | 5° |
| EX25 | PE32 | 121° | 117° | 4° |
| EX29 | PE33 | 120° | 114° | 6° |
| EX30 | PE35 | 119° | 112° | 7° |
| CE11 | PE36 | 67° | <20° | >47° |

The CE9 sample prepared from PE27 (neat FC-1) dried into a powder that did not continuously cover the surface of the glass microscope slide and, consequently, it was not possible to measure water contact angles.

The CE10 sample prepared from PE28 (neat FC-2) was characterized by a large hysteresis of 49°, and contacting water droplets did not readily move on the coating surface. Furthermore, the coated CE10 material was readily removed from the substrate by gentle abrasion. These results for the neat FC-1 and FC-2 demonstrate that these fluorochemical materials are not, by themselves, useful for repellent coatings. The organic polymeric binder coatings alone were also not highly repellent, as shown in CE11(PE36), which is a thermoplastic polyurethane with no fluorochemical additive (for water, a $\theta_{rec}$ of <20° and CAH of >47°.

Examples 31-34 (EX31-EX34)

EX31-EX34 were prepared by coating PE33-PE35 and PE17 coating solutions, respectively on aluminum substrates 1 inch×4 inches (about 2.5 cm×10 cm) in dimension. The aluminum substrates were removed from their package, rinsed with isopropanol, and wiped dry with a WYPALL paper towel. Then the aluminum coupon substrates were dip coated at a controlled speed by lowering them into the desired coating solutions, leaving a small top portion of the substrate uncoated to clamp and hold the sample. Upon maximum immersion depth of the substrate, the coupon was raised up and out of the solution at controlled speed using a standard dip-coating procedure with a KSV NIMA dip-coater [available from Biolin Scientific]. The coated samples were dried at room temperature for a few minutes and then heated at 110° C. for 15 minutes providing a coating that is about 500 nm to 1 micron after evaporation of the solvent.

Advancing and receding contact angles of droplets of water and hexadecane on the coated substrates were measured. Then, to probe the durability of the repellency of the dried coatings, the coated aluminum samples were soaked (fully submerged) overnight in deionized water in a sealed glass jar. After 24 hours, the samples were removed from the water and allowed to air dry overnight at room temperature. The advancing and receding contact angles of water and hexadecane were then measured again to look for changes and probe the durability of the coating repellency after an overnight water soak of the coating. The data are summarized in Tables 3 and 4, below.

TABLE 3

| Example | Coating Solution | Water $\theta_{adv}$ | | Water $\theta_{rec}$ | |
|---|---|---|---|---|---|
| | | Initial | After Soak | Initial | After Soak |
| EX31 | PE33 | 123 | 106 | 93 | 71 |
| EX32 | PE34 | 122 | 124 | 110 | 96 |
| EX33 | PE35 | 125 | 119 | 108 | 91 |
| EX34 | PE17 | 121 | 115 | 115 | 106 |

TABLE 4

| Example | Coating Solution | Hexadecane $\theta_{adv}$ | | Hexadecane $\theta_{rec}$ | |
|---|---|---|---|---|---|
| | | Initial | After Soak | Initial | After Soak |
| EX31 | PE33 | 38 | 43 | <20 | <20 |
| EX32 | PE34 | 84 | 83 | 66 | 47 |
| EX33 | PE35 | 80 | 78 | 62 | 52 |
| EX34 | PE17 | 79 | 76 | 76 | 57 |

The contact angle of the (e.g. ice, liquid) repellent surface can also be evaluated with other liquids instead of water or hexadecane, such as a solution of 10% by weight 2-n-butoxyethanol and 90% by weight deionized water. Advancing and receding contact angles of droplets of a solution of 10% by weight 2-n-butoxyethanol and 90% by weight deionized water on the coated substrates were measured. The data is summarized in Table 5.

TABLE 5

| Example | Coating Solution | 90/10 water/butoxyethanol $\theta_{adv}$ | 90/10 water/butoxyethanol $\theta_{rec}$ |
|---|---|---|---|
| CE7 | PE24 | 45 | <20 |
| EX31 | PE33 | 82 | 79 |
| EX32 | PE34 | 81 | 76 |
| EX33 | PE35 | 80 | 75 |
| EX34 | PE17 | 80 | 78 |

All the examples just described are believed to reduce the force required to remove ice from the repellent surface, and may delay the formation of ice on the surface of the treated substrates under icing conditions. However, due to the cost, all of such examples were not subject to testing at the Anti-icing Materials International Laboratory (AMIL, Chicoutimi, Quebec, Canada).

Preparation of the Melt Blend

The melt blend was mixed using a C.W. Brabender® Instruments Brabender® Bowl Mixer Drive Unit. The brabender was heated to 180° C. The base resins (i.e. Estane ALR CL87A) was measured and put into the brabender. Then the specified fluorochemical material additive (i.e. 4 wt.-% FC-2) was put into the base resin. 50 grams of solids were initially added to the brabender in the specified weight ratios. If the brabender bowl was not full, material would be added in 5 gram increments until the bowl was full enough to mix properly. Once all of the material was in the brabender, it was left to mix for approximately 5 mins or until all of the additive had been thoroughly mixed with the polymeric binder.

Preparation of Films—Hot Pressed

A Carver 4-post manual Hydraulic press was used to flatten the blends out into films. The press was heated to 300° F. The blends were placed between 2 sheets of PTFE film which were placed between 2 silicone pads. Force was applied until the material reached a desired thickness. The film (i.e. Estane ALR CL87A with 4 wt-% FC-2) was annealed in an 80° C. oven for 30 minutes.

Centrifugal Testing at AMIL: Pieces of the hot pressed films (i.e. Estane ALR CL87A with 4 wt-% FC-2) that were approximately 10 cm×4 cm were adhered to the end of an aluminum beam (length=34 cm, width 3.18 cm, thickness 0.63 cm) such that the major surface in the direction of the width and surfaces in the thickness direction were covered with the film.

Ice was deposited simultaneously on three test films and three bare aluminum controls at the AMIL facility by exposing them to an impinging spray of supercooled water at –10° C. These conditions yielded approximately 5 mm thick heavy rime ice with a density of 0.88 g/cm$^3$. Following icing, the beams are balanced and placed into a centrifuge specially adapted to measure ice adhesion. All measurements are performed at –10° C. The rotational speed of the beam is progressively increased until the centrifugal force detaches the ice. The detachment of the ice is picked up by piezoelectric cells that are sensitive to vibrations and the rotational speed at detachment is recorded by the computer. The specific ice adhesion strength is calculated using the speed of detachment, the mass of the ice, and the beam length. AMIL commonly reports the results as adhesion reduction factors (ARFs) that are defined as $$ARF = \frac{\text{Mean ice adhesion on bare aluminum}}{\text{Mean ice adhesion on candidate coating}}$$

The average ice adhesion strength of the film (i.e. Estane ALR CL87A with 4 wt-% FC-2) was 304 kPa. In comparison, the average ice adhesive strength of bare aluminum control was 675 kPa. This is an ice adhesion reduction factor of 2.2.

Contact angle measurement were conducted on melt extruded and annealed films of the Estane ALR CL87A with various concentration of FC-2 as a melt additive. The results are in Table 6 as follows:

TABLE 6

| | Extruded Films | | Annealed Extruded Films | |
|---|---|---|---|---|
| Wt. % FC-2 | $\theta_{adv}$ | $\theta_{rec}$ | $\theta_{adv}$ | $\theta_{rec}$ |
| 0 | 86 | 73 | 106 | 82 |
| 2 | 106 | 84 | 115 | 99 |
| 4 | 109 | 87 | 115 | 113 |
| 6 | 109 | 84 | 118 | 115 |
| 10 | 114 | 95 | 117 | 113 |

Ice adhesion testing was carried out on solution cast coatings at AMIL, in addition to the melt processed film described above. The samples were prepared by dip coating the solutions onto the aluminum substrates provided by AMIL. The solutions are as described above, except that in some cases cyclohexanone (Avantor Performance Chemicals, PA) was substituted for about 40 wt. % of the MEK. Results obtained by AMIL are summarized in Table 7.

TABLE 7

| Example | Coating Solution | Ice Adhesion kPA AMIL | Std. Deviation AMIL | ARF |
|---|---|---|---|---|
| CE11 | PE36 | 342 | 23 | 1.8 |
| EX31 | PE33 | 211 | 25 | 2.2 |
| EX34 | PE17 | 134 | 12 | 4.6 |

What is claimed is:

1. An article subject to ice formation during normal use comprising a repellent surface such that the receding contact angle of the surface with water ranges from 90 degrees to 135 degrees wherein the repellent surface comprises a compound having the formula:

$(R_f-L-P)_n A$ $R_f$ is a fluorinated group;

L is independently an organic divalent linking group;

P is a catenary, divalent heteroatom-containing carbonyl moiety;

A is hydrocarbon moiety comprising 4 to 40 carbon atoms;

and n ranges from 1 to 3.

2. The article of claim 1 wherein the repellent surface further comprises an organic polymeric binder.

3. The article of claim 1 wherein L is the group —SO$_2$N(CH$_3$)(CH$_2$)$_n$— wherein n ranges from 1-4.

4. The article of claim 1 wherein $R_f$ comprises less than 2% of fluorinated groups having greater than 6 carbon atoms.

5. The article of claim 1 wherein $R_f$ comprises less than 25% of fluorinated groups having greater than 4 carbon atoms.

6. The article of claim 1 wherein $R_f$ is CF$_3$[CF$_2$]$_3$– for at least 50 wt.-% of the fluorochemical material.

7. The article of claim 1 wherein the hydrocarbon moiety is a saturated alkylene moiety.

8. The article of claim 1 wherein the fluorochemical material has a fluorine content of at least 25 wt-%.

9. The article of claim 1 wherein n of the formula of claim 1 averages at least 2.

10. The article of claim 1 wherein the polymeric binder is a non-fluorinated polymeric binder selected from polystyrene, acrylic, polyester, polyurethane, polyolefin, and polyvinyl chloride.

11. The article of claim 1 wherein the fluorochemical material does not form a covalent bond with the polymeric binder.

12. The article of claim 1 wherein the repellent surface exhibits a difference between the advancing contact angle and receding contact angle with water of less than 15 degrees.

13. The article of claim 1 wherein the repellent surface exhibits a receding contact angle with water of at least 90 degrees after soaking in water for 24 hours.

14. The article of claim 1 wherein the repellent surface exhibits a receding contact angle with hexadecane of at least 60 degrees.

15. The article of claim 1 wherein the repellent surface exhibits a receding contact angle with hexadecane of at least 50 degrees after soaking in water for 24 hours.

16. The article of claim 1 wherein the fluorochemical material is not a fluoroalkyl silsesquioxane.

17. The article of claim 1 wherein the repellent surface comprises a thermally processable polymer and a fluorochemical material melt additive.

18. The article of claim 1 wherein the article is selected from the group consisting of heat exchangers, sign faces, signal transmission lines, satellite dishes, antennas, solar panels, wind turbine blades, automobiles, railroad cars, aircraft, watercraft, navigation equipment, heat pumps and exchangers or components thereof; ice manufacturing facilities and articles; commercial and residential refrigerators and freezers; cryogenic and supercomputer storage facilities; buildings, roofing, dams, oil drilling platforms, outdoor sporting equipment recreational vehicles, and snow removal equipment.

19. The article of claim 1 wherein the repellent surface reduces the force of ice adhesion in comparison to the same article without the repellent surface.

20. The article of claim 1 wherein the repellent surface or coating is free of fluoroalkyl groups with 8 or more carbon atoms.

21. The article of claim 1 wherein the repellent surface or coating exhibits a receding contact angle with a solution containing 10% by weight of 2-n-butoxyethanol and 90% by weight deionized water is at least 45 degrees.

\* \* \* \* \*